United States Patent
Shinoda et al.

(10) Patent No.: US 10,409,250 B2
(45) Date of Patent: Sep. 10, 2019

(54) SERVOMOTOR CONTROL DEVICE

(71) Applicant: FANUC CORPORATION, Minamitsuru-gun, Yamanashi (JP)

(72) Inventors: Shougo Shinoda, Yamanashi (JP); Satoshi Ikai, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/996,749

(22) Filed: Jun. 4, 2018

(65) Prior Publication Data

US 2018/0348727 A1    Dec. 6, 2018

(30) Foreign Application Priority Data

Jun. 6, 2017   (JP) .................................. 2017-111902

(51) Int. Cl.
  *G05B 19/042*   (2006.01)
  *G05B 19/416*   (2006.01)
  *G05B 19/00*    (2006.01)

(52) U.S. Cl.
  CPC ....... *G05B 19/0428* (2013.01); *G05B 19/416* (2013.01); *G05B 2219/23416* (2013.01);
  (Continued)

(58) Field of Classification Search
  USPC ........................................ 318/625, 432, 434
  See application file for complete search history.

(56) References Cited

U.S. PATENT DOCUMENTS

| 4,816,734 A | * | 3/1989 | Kurakake | ............... | G05B 11/32 |
| | | | | | 318/561 |
| 2010/0109594 A1 | * | 5/2010 | Miyaji | .................. | G05B 19/19 |
| | | | | | 318/632 |

(Continued)

FOREIGN PATENT DOCUMENTS

| JP | 11-237920 | 8/1999 |
| JP | 11-345025 | 12/1999 |

(Continued)

OTHER PUBLICATIONS

Notification of Reasons for Refusal dated Jan. 29, 2019 in corresponding Japanese Patent Application No. 2017-111902.

*Primary Examiner* — Bentsu Ro
(74) *Attorney, Agent, or Firm* — Wenderoth, Lind & Ponack, L.L.P.

(57) ABSTRACT

A servomotor control device includes: a servomotor; a driven body that is driven by the servomotor; a connection mechanism that connects the servomotor and the driven body; a first position detection section that detects a position of the servomotor; a second position detection section that detects a position of the driven body; and a motor control unit, in which the motor control unit includes: a force estimation section that estimates a drive force acting on the driven body at a connection part between the connection mechanism and the driven body; a rigidity estimation section that estimates a magnitude of rigidity of the connection mechanism based on a detected position of the servomotor, a detected position of the driven body, and an estimated drive force; and a rigidity variation detection section that detects a change in rigidity of the connection mechanism, based on the estimated magnitude of rigidity.

10 Claims, 7 Drawing Sheets

(52) U.S. Cl.
CPC .............. *G05B 2219/23431* (2013.01); *G05B 2219/37582* (2013.01); *G05B 2219/50049* (2013.01)

(56) References Cited

U.S. PATENT DOCUMENTS

| | | | |
|---|---|---|---|
| 2012/0249041 A1* | 10/2012 | Kuramoto | G05B 19/19 318/561 |
| 2018/0067469 A1* | 3/2018 | Shinoda | G05B 19/404 |
| 2018/0095444 A1* | 4/2018 | Shinoda | G05B 19/19 |
| 2018/0157236 A1* | 6/2018 | Shinoda | G05B 19/404 |

FOREIGN PATENT DOCUMENTS

| | | |
|---|---|---|
| JP | 2012-168926 | 9/2012 |
| JP | 2016-034224 | 3/2016 |

\* cited by examiner

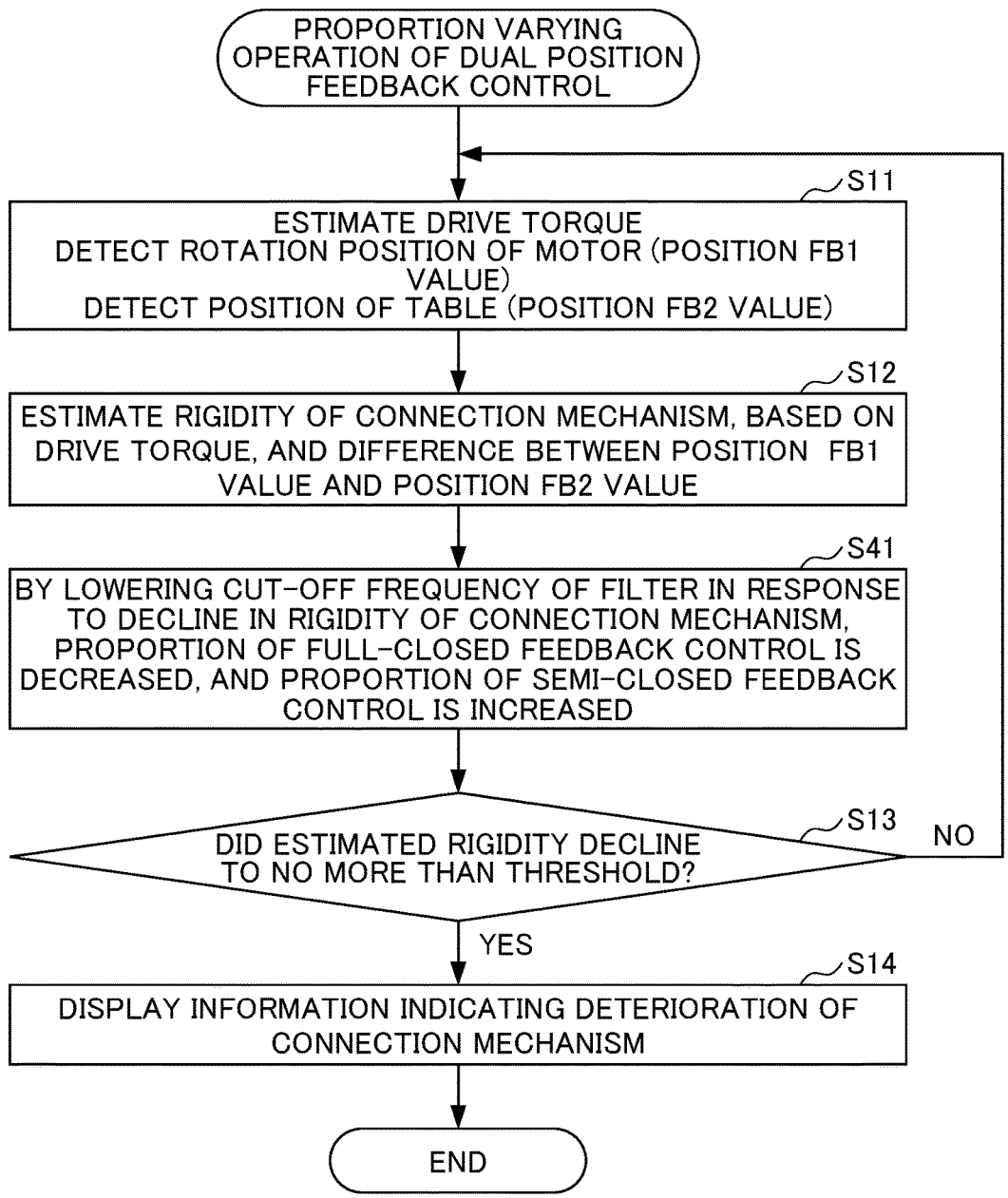

SERVOMOTOR CONTROL DEVICE

This application is based on and claims the benefit of priority from Japanese Patent Application. No. 2017-111902, filed on 6 Jun. 2017, the content of which is incorporated herein by reference.

BACKGROUND OF THE INVENTION

Field of the Invention

The present invention relates to a servomotor control device which has a self-monitoring function for aging in the rigidity of a connection mechanism that connects a servomotor and driven body and transmits drive power of the servomotor to the driven body.

Related Art

For example, a servomotor control device has been known that controls the position of a workpiece (work) using servomotors in a machine tool or the like. The servomotor control device mounts the workpiece on a table (driven body) (also referred to as mobile body), and causes the table to move by a servomotor via the connection mechanism. The connection mechanism has a coupling connected to a servomotor, a ball screw that is fixed to the coupling, and a nut that is threaded with the ball screw, and connected to the table. When causing the ball screw to rotate by way of the servomotor, the nut threaded to the ball screw is driven in the axial direction of the ball screw, and the table connected to the nut is thereby moved.

With such a connection mechanism (particularly the coupling and ball screw), the rigidity is relatively low, and elastic deformation occurs. When the connection mechanism elastically deforms, error in the amount of elastic deformation arises in the position of the table. Concerning this point, technology for correcting the position of the table has been known.

Patent Documents 1 and 2 disclose technology for correcting positional error (positioning error) caused by aging of rigidity of the connection mechanism, based on the rotation amount of the servomotor detected by an encoder in the servomotor (semi-closed feedback value), and a movement amount of the table detected by a linear scale fixed to the table (full-closed feedback value).

Patent Document 1: Japanese Unexamined Patent Application, Publication No. H11-345025

Patent Document 2: Japanese Unexamined Patent Application, Publication No. H11-237920

SUMMARY OF THE INVENTION

However, maintenance of the connection mechanism is necessary according to the extent of aging in rigidity of the connection mechanism. For this reason, it is necessary to grasp the aging in rigidity of the connection mechanism.

The present invention has an object of providing a servomotor control device that detects a change in rigidity of the connection mechanism.

(1) A servomotor control device (for example, the servomotor control device 1, 1A, 1B, 1C described later) according to the present invention includes: a servomotor (for example, the servomotor 50 described later); a driven body (for example, the table 70 described later) that is driven by way of the servomotor; a connection mechanism (for example, the connection mechanism 60 described later) that connects the servomotor and the driven body to transmit power of the servomotor to the driven body; a first position detection section (for example, the encoder 40 described later) that detects a position of the servomotor; a second position detection section (for example, the scale 80 described later) that detects a position of the driven body; and a motor control unit (for example, the motor control unit 10, 10A, 10B, 10C described later) that controls the servomotor, in which the motor control unit includes: a force estimation section (for example, the force estimation section 20 described later) that estimates a drive force acting on the driven body at a connection part between the connection mechanism and the driven body; a rigidity estimation section (for example, the rigidity estimation section 22 described later) that estimates a magnitude of rigidity of the connection mechanism based on a position of the servomotor detected by the first position detection section, a position of the driven body detected by the second position detection section, and a drive force estimated by the drive force estimation section; and a rigidity variation detection section (for example, the deterioration detection section 26A, rigidity variation detection section 26B described later) that detects a change in rigidity of the connection mechanism, based on the magnitude of rigidity estimated by the rigidity estimation section.

(2) In the servomotor control device described in (1), the rigidity estimation section may estimate a magnitude of rigidity (R) of the connection mechanism according to Formula (1), based on a difference (δ) between a position of the servomotor detected by the first position detection section and a position of the driven body detected by the second position detection section, and a drive force (T) estimated by the force estimation section:

$$\text{Magnitude of rigidity } (R) = \text{drive force } (T)/\text{difference } (\delta) \text{ between position of servomotor and position of driven body} \quad (1).$$

(3) In the servomotor control device described in (1) or (2), the rigidity variation detection section may detect deterioration of the connection mechanism as a change in rigidity of the connection mechanism, when the magnitude of rigidity estimated by the rigidity estimation section declines to no more than a predetermined threshold.

(4) In the servomotor control device described in (1) or (2), the motor control unit may further include: a storage section (for example, the storage section 24 described later) that stores, as rigidity data, a plurality of magnitudes of rigidity estimated by the rigidity estimation section at every predetermined time interval or indefinite time interval, and the rigidity variation detection section may detect a change and variation in rigidity of the connection mechanism based on the rigidity data stored in the storage section.

(5) In the servomotor control device described in (3), the motor control unit may further include a notification section (for example, the display section 28 described later) that notifies information indicating deterioration detected by the rigidity variation detection section, or information indicating the magnitude of rigidity detected by the rigidity estimation section.

(6) in the servomotor control device described in (4), the motor control unit may further include a notification section (for example, the display section 28 described later) that notifies information indicating at least one of the change and a variation in rigidity detected by the rigidity variation detection section, or information indicating the magnitude of rigidity detected by the rigidity estimation section.

(7) In the servomotor control device described in (5) or (6), the notification section may be a display device which displays information.

(8) In the servomotor control device described in any one of (1) to (6), the motor control unit may further include: a dual position control section (for example, the dual position control section 30 described later) that performs semi-closed feedback control based on a high-frequency component of a first deviation between a position command value for drive control of the servomotor and the position of the servomotor detected by the first position detection section, and full-closed feedback control based on a low-frequency component of a second deviation between the position command value and the position of the driven body detected by the second position detection section; and a control proportion varying section (for example, the control proportion varying section 35 described later) that causes a proportion of the semi-closed feedback control to increase, and a proportion of the full-closed feedback control to decrease in the dual position control section, in response to a decline in the rigidity of the connection mechanism estimated by the rigidity estimation section.

(9) In the servomotor control device described in (8), the dual position control section may further include: a first subtraction part (for example, the subtracter 31A described later) that obtains a first deviation between the position command value and the position of the servomotor detected by the first position detection section; a second subtraction part (for example, the subtracter 31B described later) that obtains a second deviation between the position command value and the position of the driven body detected by the second position detection section; a high-pass filter (for example, the high-pass filter 32A described later) that inputs the first deviation from the first subtraction part; a low-pass filter (for example, the low-pass filter 32B described later) that inputs the second deviation from the second subtraction part; and an addition part (for example, the adder 33 described later) that adds a high-frequency component of the first deviation outputted from the high-pass filter and a low-pass component of the second deviation outputted from the low-pass filter, and the control proportion varying section may cause a cut-off frequency of the high-pass filter and a cut-off frequency of the low-pass filter to decline in response to a decline in the rigidity of the connection mechanism.

(10) In the servomotor control device described in (9), the control proportion varying section may set the cut-off frequency of the high-pass filter and the cut-off frequency of the low-pass filter to be the same.

According to the present invention, it is possible to provide a servomotor control device that detects a change in rigidity of a connection mechanism.

BRIEF DESCRIPTION OF THE DRAWINGS

FIG. 8 is a flowchart showing a proportion varying operation of dual position feedback control by the servomotor control device according to the third embodiment.

DETAILED DESCRIPTION OF THE INVENTION

Hereinafter, examples of embodiments of the present invention will be explained by referencing the attached drawings. It should be noted that the same reference symbols shall be attached to the same or corresponding portions in the respective drawings.

Figure 1:
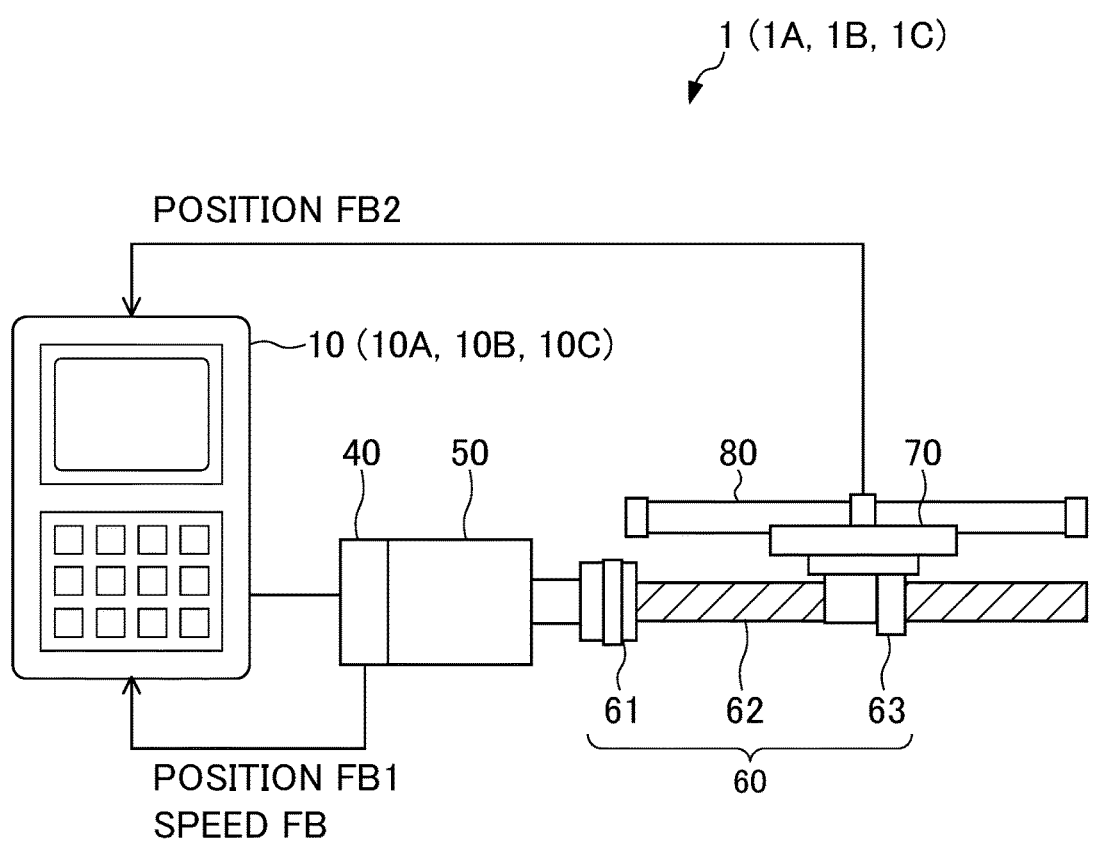
FIG. 1 is a view showing an example of the structure of a servomotor control device according to an embodiment of the present invention.

FIG. 1 is a view showing an example of the configuration of a servomotor control device according to an embodiment of the present invention. As shown in FIG. 1, a servomotor control device 1 includes a motor control unit 10, a servomotor 50, an encoder (first position detection section) 40, a connection mechanism 60, a table (driven body) 70, and a scale (second position detection section) 80.

The servomotor control device 1 moves the table 70 by the servomotor 50 via the connection mechanism 60, and machines a workpiece (work) mounted on the table 70. The connection mechanism 60 has a coupling 61 which is connected to the servomotor 50, and a ball screw 62 which is fixed to the coupling 61, and a nut 63 is threaded to the ball screw 62. The nut 63 threaded. with the ball screw 62 is moved in the axial direction of the ball screw 62 by the rotational driving of the servomotor 50, whereby the table 70 connected to the nut 63 is moved.

The rotation angle position of the servomotor 50 is detected by the encoder 40 provided to the servomotor 50, and the detected rotational position (rotation amount) is used as first position feedback (hereinafter referred to as position FB1). Herein, since the rotation angle position of the servomotor 50 and the position of the table 70 are in a corresponding relationship, the rotational position detected by the encoder 40, i.e. position FB1 value, indicates the position of the table 70. It should be noted that the encoder 40 can detect the rotation speed, and the detected speed is applicable as speed feedback (hereinafter referred to as speed FB).

In addition, the position of the table 70 is detected by the scale 80 provided to the table 70, and the detected position is used as a second position feedback (hereinafter referred to as position FB2).

The motor control unit 10 controls the servomotor 50 based on the position command value in accordance with a machining program, the position FB1 value or position FB2 value, and speed FB value. In addition, the motor control unit 10 detects a change (e.g., deterioration or variation) in the rigidity of the connection mechanism 60. The details of the motor control unit 10 will be described later.

Hereinafter, servomotor control devices 1A, 1B and 1C of three embodiments will be explained in detail as the servomotor control device 1. The servomotor control devices 1A, 1B and 1C of first to third embodiments differ in the point of respectively including motor control units 10A, 10B and 10C as the motor control unit 10 in the aforementioned servomotor control device 1. Other configurations of the servomotor control devices 1A, 1B and 1C of the first to third embodiments are the same as the aforementioned servomotor control device 1.

(Servomotor Control Device of First Embodiment)

In FIG. 1, the servomotor control device 1A according to the first embodiment includes the motor control unit 10A as the aforementioned motor control unit 10.

Figure 2:
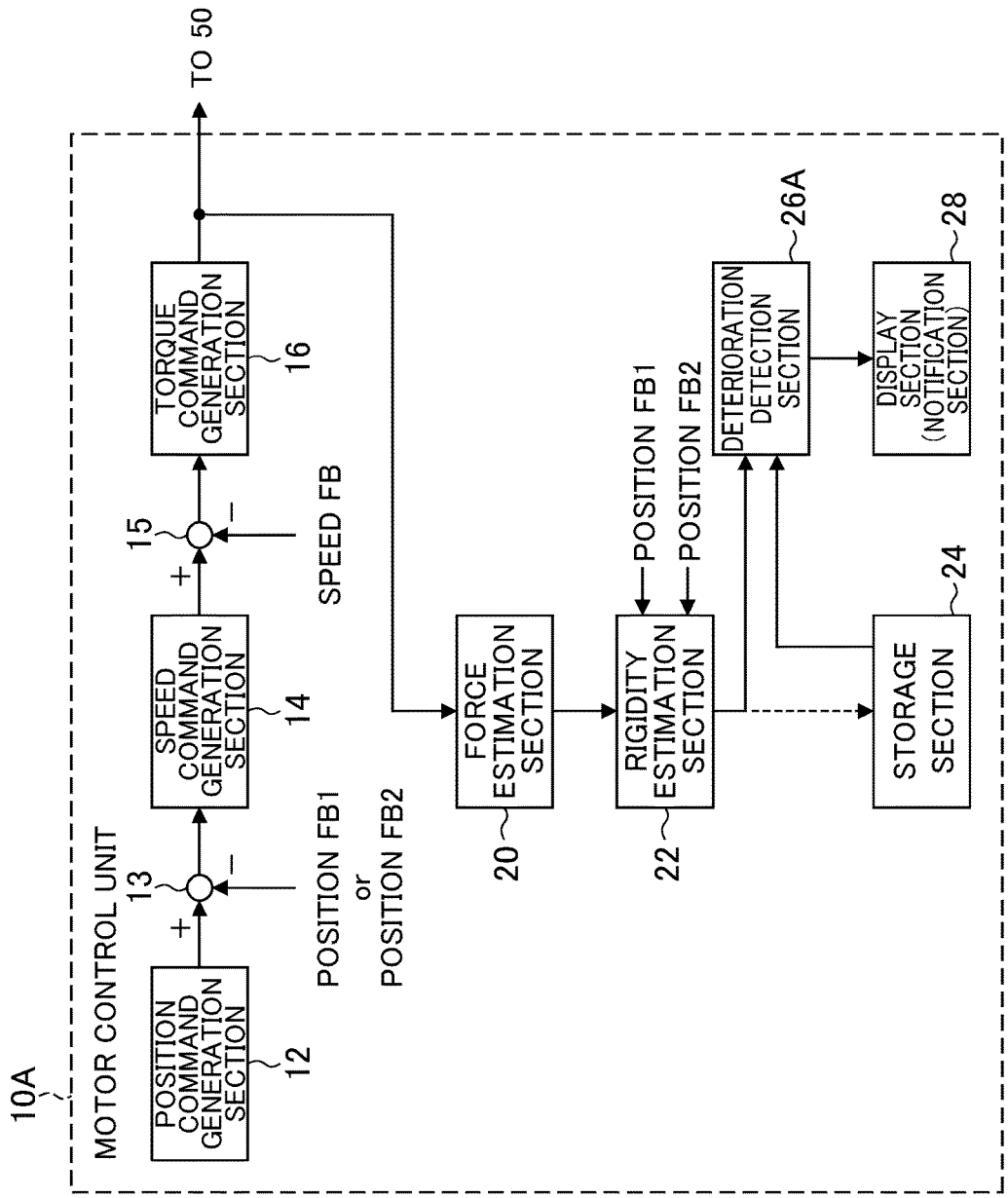
FIG. 2 is a view showing the structure of a motor control unit in the servomotor control device according to a first embodiment.

FIG. 2 is a view showing the configuration of the motor control unit 10A in the servomotor control device 1A according to the first embodiment. As shown in FIG. 2, the motor control unit 10A includes a position command generation section 12, subtracters 13, 15, speed command generation section 14, torque command generation section 16, force estimation section 20, rigidity estimation section 22, storage section 24, deterioration detection section (rigidity variation detection section) 26A, and display section (notification section) 28.

The command generation section 12 creates a position command value for the servomotor 50 in accordance with a program or instruction inputted from a higher-order control device or external input device, etc. (not illustrated). The subtracter 13 obtains a difference between the position command value created by the position command generation section 12 and the position FB1 value from the encoder 40 (or position FB2 value from the scale 80). The speed command generation section 14 creates a speed command value for the servomotor 50 based on the finite difference obtained by the subtracter 13. The subtracter 15 obtains a difference between the speed command value created by the speed command generation section 14 and the speed FB value from the encoder 40. The torque command generation section 16 creates a torque command value for the servomotor 50 based on the deviation obtained by the subtracter 15, and supplies to the servomotor 50.

The force estimation section 20 estimates a drive torque (drive force) acting on the table 70 at a connection part between the table 70 (nut 63) and connection. mechanism 60, based on the torque command value from the torque command generation section 16. It should be noted that the force estimation section 20 may estimate the drive torque based on the drive electric current of the servomotor 50, i.e. actual electric current (actual torque), detected using a current detector.

The rigidity estimation section 22 estimates the magnitude of rigidity of the connection mechanism 60, based on the drive torque estimated by the force estimation section 20, the position FB1 value from the encoder 40 (position of the servomotor 50 detected by the encoder 40, i.e. position of the table 70), and the position FB2 value from the scale 80 (position of the table 70 detected by the scale 80). More specifically, the rigidity estimation section 22 estimates the magnitude of rigidity (R) of the connection mechanism 60, according to Formula (2) below, based on the drive torque value (T) estimated, and the difference (δ) between the position FB1 value and position FB2 value.

$$\text{Magnitude of rigidity }(R)=\text{drive torque value }(T)/ \text{difference }(\delta)\text{ between position FB1 value and position FB2 value} \quad (2)$$

The details of the estimation method for the magnitude of rigidity of the connection mechanism 60 will be described later.

The storage section 24 stores a threshold for deterioration detection of the connection mechanism 60 in advance. The threshold, for example, is a lower limit value for the rigidity of the connection mechanism 60 for satisfying the specifications of machining precision. The storage section 24 is rewritable memory such as EEPROM, for example.

The deterioration detection section 26A detects deterioration (change in rigidity) of the connection mechanism 60 based on the magnitude of rigidity estimated by the rigidity estimation section 22. More specifically, the deterioration detection section 26A detects deterioration of the connection mechanism 60 when the magnitude of rigidity estimated by the rigidity estimation section 22 has declined to no more than the threshold stored in the storage section 24.

The display section 28 displays information (for example, numerical values, text, images, etc.) indicating deterioration of the connection mechanism 60 detected by the deterioration detection section 26A. The display section 28 may display information indicating the magnitude of rigidity estimated by the rigidity estimation section 22. The display section 28 is a display device such as a liquid crystal display, for example.

The motor control unit 10A (and motor control units 10B, 10C described later) is configured by arithmetic processors such as a DSP (Digital Signal Processor), and FPGA (Field-Programmable Gate Array), for example. The various functions (position command generation section 12, subtracters 13, 15, speed command generation section 14, torque command generation section 16, force estimation section 20, rigidity estimation section 22, deterioration detection section 26A, rigidity variation detection section 26B described later, dual position control section 30 described later (subtracters 31A, 31B, high-pass filter 32A, low-pass filter 32B, adder 33), and control proportion varying section 35 described later) of the motor control unit 10A (motor control units 10B, 10C) are realized by executing predetermined software (programs) saved in a storage unit (for example, the storage section 24). The various functions of the motor control unit 10A (motor control unit 10B, 10C) may be realized by the cooperation of hardware and software, or may be realized by only hardware (electronic circuits).

Figure 3:
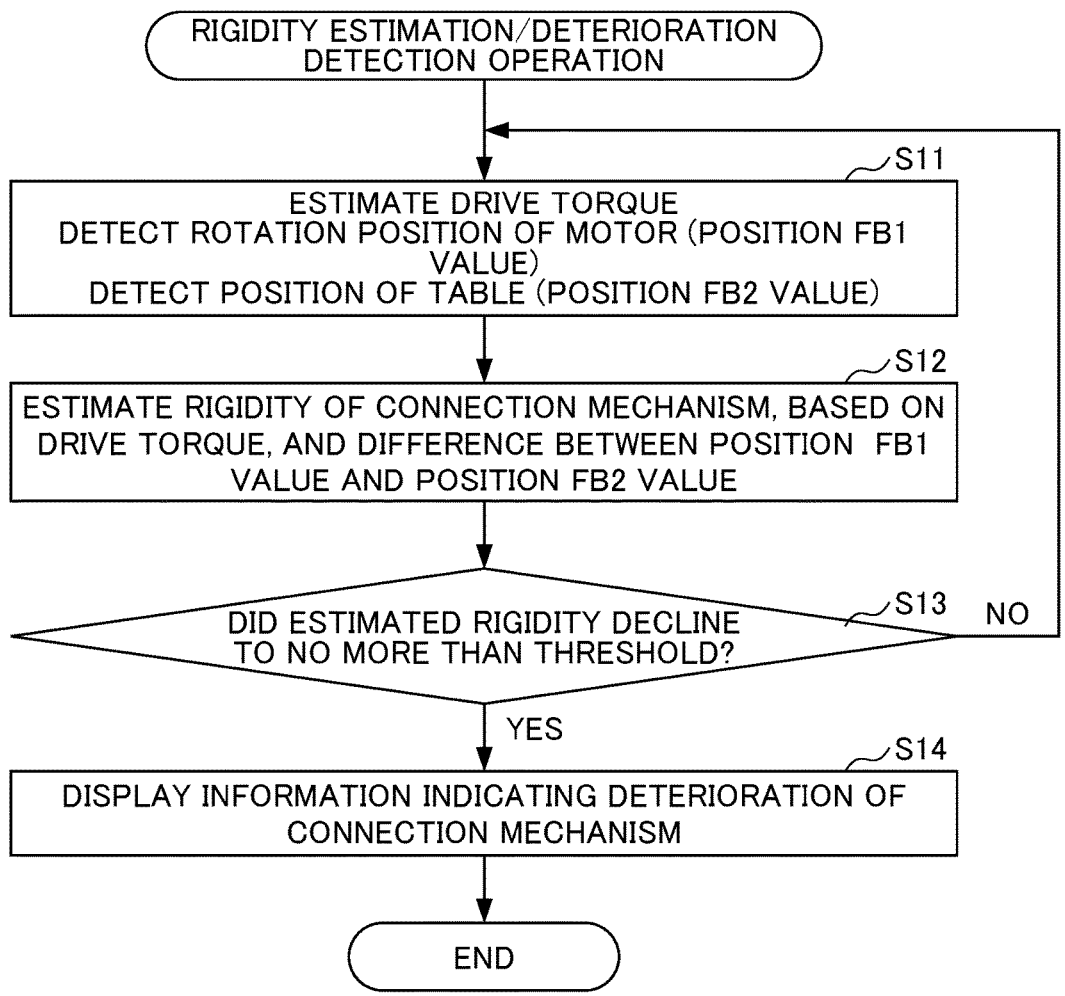
FIG. 3 is a flowchart showing operations of rigidity estimation and deterioration detection of a connection mechanism by the servomotor control device according to the first embodiment.

Next, the operations for rigidity estimation and deterioration detection of the connection mechanism 60 by way of the servomotor control device 1A of the first embodiment will be explained by referencing FIG. 3. FIG. 3 is a flowchart showing operations of rigidity estimation and deterioration detection of the connection mechanism 60 by way of the servomotor control device 1A of the first embodiment.

First, in Step S11, the motor control unit 10A supplies a torque command according to the position command (movement command) to the servomotor 50 to cause the servomotor 50 to rotate. At this time, the force estimation section 20 estimates the drive torque acting on the table 70 at the connection part between the table 70 (nut 63) and connection mechanism 60, based on the torque command from the torque command generation section 16. In addition, the rotation position of the servomotor 50 (rotation position corresponding to position of table 70) is detected by the encoder 40 of the servomotor 50, and sent to the motor control unit 10A as the position FB1 value. In addition, the position of the table 70 is detected by the scale 80 of the table 70, and sent to the motor control unit 10A as the position FB2 value.

Next, in Step S12, the rigidity estimation section 22 estimates the magnitude of rigidity of the connection mechanism 60 based on the drive torque value estimated by the force estimation section 20, and the difference between the position FB1 value from the encoder 40 and the position FB2 value from the scale 80.

A difference between the rotation position of the servomotor 50 detected by the encoder 40 (i.e. rotation position corresponding to position of table 70) (position FB1 value) and the position of the table 70 detected by the scale 80 (position FB2 value) is produced due to elastic deformation such as twisting of the connection mechanism (ball screw, coupling, etc.). Then, the rigidity is expressed by the ratio of deformation amount (elastic deformation amount) relative to the force applied (drive torque). The rigidity estimation section 22 thereby estimates the magnitude of rigidity (R) according to Formula (2) below.

$$\text{Magnitude of rigidity } (R) = \text{drive torque value } (T)/\text{elastic deformation amount} = \text{drive torque value } (T)/\text{difference } (\delta) \text{ between position FB1 value and position FB2 value} \quad (2)$$

It should be noted that the rigidity estimated by the rigidity estimation section 22 in the present embodiment includes elastic deformation and the influence of play.

Herein, the rigidity of the connection mechanism 60 ages (declines). For example, the rigidity of the ball screw 62 in the connection mechanism 60 declines due to the preloading weakening with time. Since the machining precision of the machine tool declines if the rigidity declines, maintenance of the connection mechanism 60 is necessary.

Therefore, in Step S13, the deterioration detection section 26A detects the deterioration of the connection mechanism 60, based on the magnitude of rigidity estimated by the rigidity estimation section 22. More specifically, the deterioration detection section 26A determines whether or not the magnitude of rigidity estimated by the rigidity estimation section 22 has declined to no more than a threshold stored in the storage section 24. Generally, a margin on the order of 20% to 30% is established in the gain of the control loop of the motor control unit 10A so as to satisfy the specifications of machining precision even if the rigidity of the connection mechanism 60 declines. The threshold is thereby set to on the order of 70% of the initial value for rigidity, for example.

In Step S13, in the case of the magnitude of rigidity having declined to no more than the threshold, the deterioration detection section 26A detects deterioration of the connection mechanism 60. At this time, in Step S14, the display section 28 displays information indicating deterioration of the connection mechanism 60.

On the other hand, in Step S13, in the case of the magnitude of rigidity being greater than the threshold, the motor control unit 10A returns to Step S11 after a predetermined time elapse, and repeats the aforementioned operation. It should be noted that the motor control unit 10A is not limited to after a fixed time (predetermined time) elapse set in advance, and may repeat the aforementioned operation after an irregular time elapse (at indefinite time intervals). Alternatively, the motor control unit 10A may repeat the aforementioned operations at all times, or during set specific operations (for example, during startup).

It should be noted that, in Step S12, the rigidity estimation section 22 may store the estimated magnitude of rigidity in the storage section 24. In addition, in Step S13, the deterioration detection section 26A may detect deterioration of the connection mechanism 60, based on the latest magnitude of rigidity stored in the storage section 24.

As explained above, with the servomotor control device 1A of the present embodiment, the force estimation section 20 estimates the drive torque acting on the table 70 at the connection part between the connection mechanism 60 and the table (driven body) 70. In addition, the rigidity estimation section 22 estimates the magnitude of rigidity of the connection mechanism 60, based on the drive torque estimated by the force estimation section 20, the position of the servomotor 50 (position FB1 value) detected by the encoder (first position detection section) 40, and the position of the table 70 (position FB2 value) detected by the scale (second position detection section) 80. In addition, the deterioration detection section (rigidity variation detection section) 26A detects deterioration (rigidity change) of the connection mechanism 60, based on the magnitude of rigidity estimated by the rigidity estimation section 22. Therefore, it is possible to confirm the existence of the necessity for maintenance of the connection mechanism 60.

In addition, with the servomotor control device 1 of the present embodiment, since the display section (notification section) 28 displays information indicating deterioration of the connection mechanism 60, it is possible for a user to confirm the existence of the necessity for maintenance of the connection mechanism 60.

(Servomotor Control Device According to Second Embodiment)

In the first embodiment, deterioration of the connection mechanism 60 is detected every time estimating the magnitude of rigidity. In the second embodiment, the magnitude of rigidity is estimated every predetermined time interval or indefinite time interval, this plurality of magnitudes of rigidity is stored as rigidity data, and the aging (change) (decline) in rigidity and variation thereof (amount of change) (amount of decline) is detected based on the stored rigidity data.

In FIG. 1, the servomotor control device 1B according to the second embodiment includes the motor control unit 10B as the aforementioned motor control unit 10.

Figure 4:
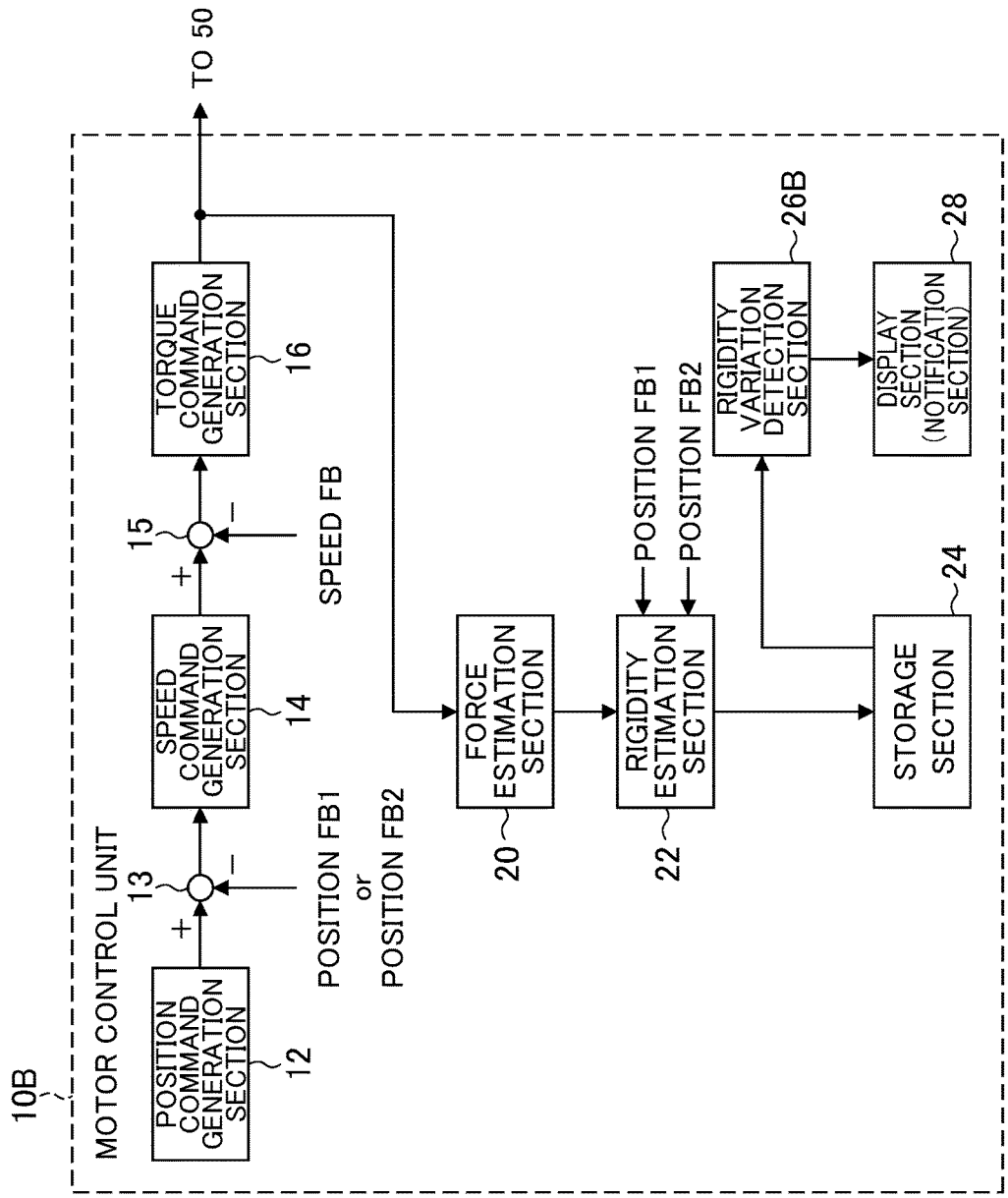
FIG. 4 is a view showing the configuration of a motor control unit in a servomotor control device according to a second embodiment.

FIG. 4 is a view showing the configuration of the motor control unit 10B in the servomotor control device 1B according to the second embodiment. The motor control unit 10B of the second embodiment shown in FIG. 4 differs from the first embodiment in the point of including the rigidity variation detection section 26B in place of the deterioration detection section 26A of the motor control unit 10A shown in FIG. 2.

The storage section 24 stores a plurality of magnitudes of rigidity estimated by the rigidity estimation section 22 at every predetermined time interval to be associated with the operating amounts (e.g., hours) at this time as rigidity data. It should be noted that the storage section 24 is riot limited to every fixed time interval set in advance (predetermined time interval), and may store the plurality of magnitudes of rigidity at every irregular time interval (indefinite time interval) to be associated with the operating amounts (e.g., hours) at this time as rigidity data.

The rigidity variation detection section 26B detects a aging (change) (decline) in rigidity of the connection mechanism 60 and variation thereof (amount of decline) based on the rigidity data stored in the storage section 24.

The display section 28 displays information indicating the aging (change) (decline) in rigidity of the connection mechanism 60 detected by the rigidity variation detection section 26B, and the variation thereof (amount of decline).

Figure 5:
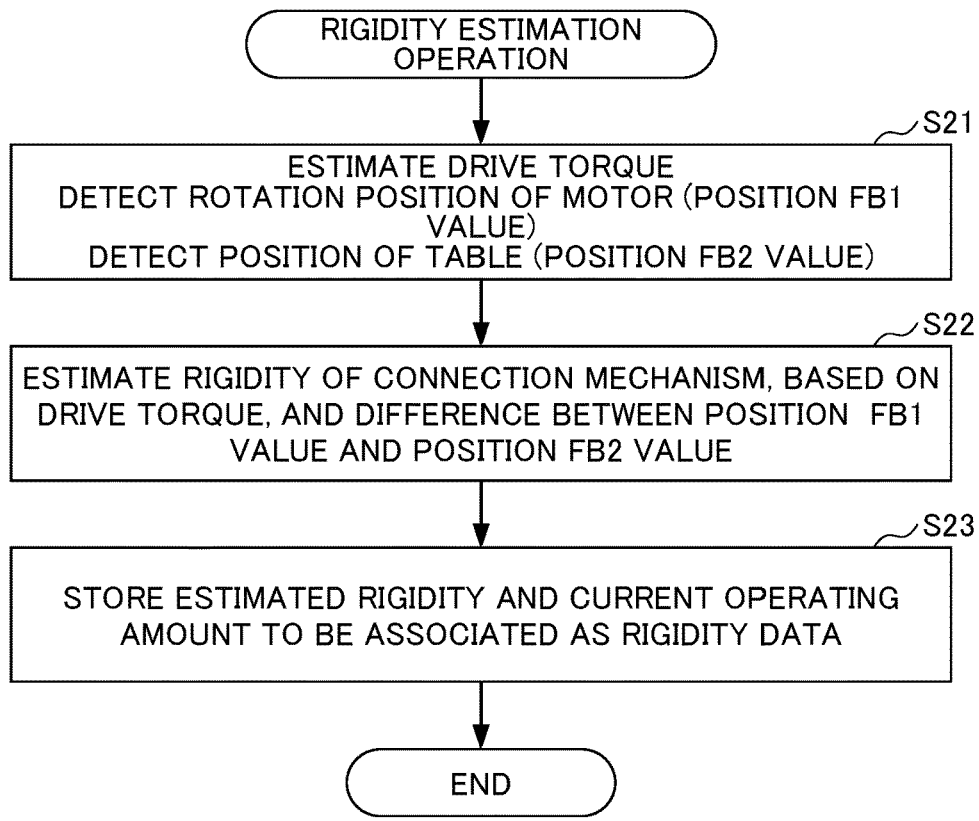
FIG. 5 is a flowchart showing a rigidity estimation operation for a connection mechanism by the servomotor control device according to the second embodiment.
Figure 6:
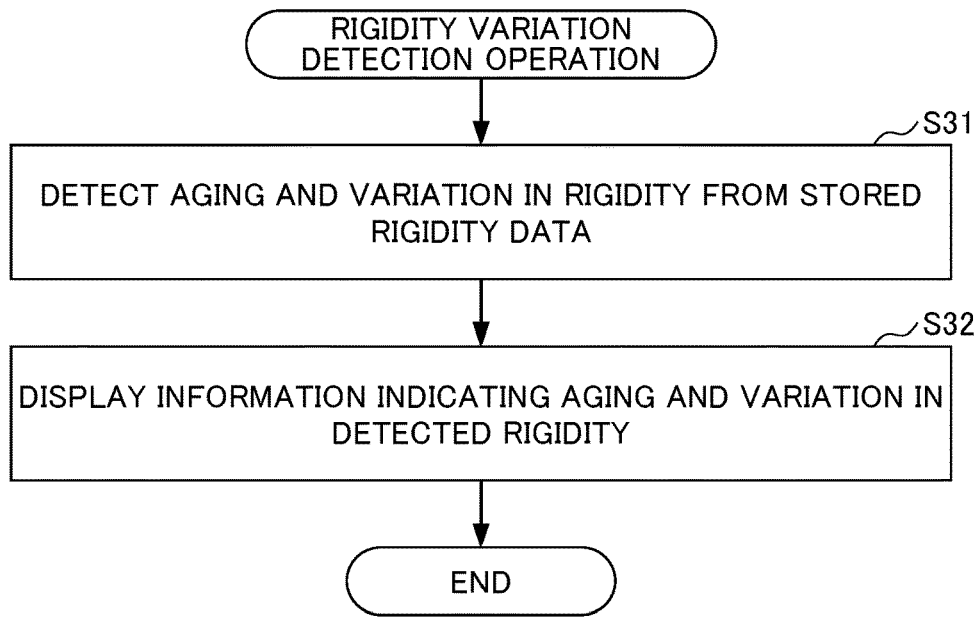
FIG. 6 is a flowchart showing a rigidity variation detection operation for a connection mechanism by the servomotor control device according to the second embodiment.

Next, the rigidity estimation operation and rigidity variation detection operation for the connection mechanism 60 by way of the servomotor control device 1B of the second embodiment will be explained by referencing FIG. 5 and FIG. 6. FIG. 5 is a flowchart showing the rigidity estimation operation for the connection mechanism 60 by way of the servomotor control device 1B of the second embodiment, and FIG. 6 is a flowchart showing the rigidity variation detection operation for the connection mechanism 60 by way of the servomotor control device 1B of the second embodiment.

(Rigidity Estimation Operation)

First, in Step S21 of FIG. 5, similarly to Step S11 in FIG. 3 mentioned above, the motor control unit 10B causes the servomotor 50 to rotate, and estimates the drive torque acting on the table 70 at the connection part between the table 70 (nut 63) and connection mechanism 60. In addition, the rotation position of the servomotor 50 (rotation position corresponding to position of table 70) is detected by the encoder 40, and sent to the servo control unit 10B as the position FB1 value. In addition, the position of the table 70 is detected by the scale 80, and sent to the motor control unit 10B as the position FB2 value.

Next, in Step S22, similarly to Step S12 in FIG. 3 mentioned above, the rigidity estimation unit 22 estimates the magnitude of rigidity of the connection mechanism 60, based on the drive torque value estimated by the force estimation section 20, and the difference between the position FB1 value from the encoder 40 and the position FB2 value from the scale 80.

Next, in Step S23, the rigidity estimation section 22 stores the estimated magnitude of rigidity in the storage section 24 to be associated with the current operating amount as rigidity data.

The motor control unit 10B repeats the aforementioned operations of Steps S21 to S23 at every predetermined time interval. The rigidity data in which a plurality of magnitudes of rigidity estimated at every predetermined time interval and the operating amounts are associated is thereby stored in the storage section 24. It should be noted that the motor control unit 10B may repeat the aforementioned operations of Steps S21 to S23 at every irregular time interval (indefinite time intervals). In this case, the rigidity data in which a plurality of magnitudes of rigidity estimated at every irregular time interval (indefinite time interval) and the operating amounts are associated is stored in the storage section 24. Alternatively, the motor control unit 10B may repeat the aforementioned operations of Steps S21 to S23 at all times, or during set specific operations (for example, during startup).

(Rigidity Variation Detection Operation)

In Step S31 of FIG. 6, the rigidity variation detection section 26B detects aging (change) (decline) in rigidity of the connection mechanism 60 and the variation thereof (amount of decline), based on the rigidity data stored in the storage section 24.

Next, in Step S32, the display section 28 displays information indicating the aging (change) (decline) in rigidity and variation thereof (amount of decline) detected by the rigidity variation detection section 26B.

Also with the servomotor control device 1B of the present embodiment, the force estimation section 20 estimates the drive torque acting on the table 70 at the connection part between the connection mechanism 60 and table (driven body) 70. In addition, the rigidity estimation section 22 estimates the magnitude of rigidity of the connection mechanism 60, based on the drive torque estimated by the force estimation section 20, the position of the servomotor 50 (position FB1 value) detected by the encoder (first position detection section) 40, and the position of the table 70 (position FB2 value) detected by the scale (second position detection section) 80. In addition, with the servomotor control device 1B of the present embodiment, the rigidity variation detection section 26B detects the aging (change) (decline) in rigidity of the connection mechanism 60 and the variation thereof (amount of decline), based on the rigidity data stored in the storage section 24, which includes a plurality of magnitudes of rigidity estimated by the rigidity estimation section 22 at every predetermined time interval or indefinite time interval. Therefore, it is possible to confirm the existence of the necessity for maintenance of the connection mechanism 60.

In addition, with the servomotor control device 1B of the present embodiment, since the display section 28 displays information indicating the aging (change) (decline) in rigidity of the connection mechanism 60 and variation thereof (amount of decline), the user can confirm the existence of the necessity for maintenance of the connection mechanism 60.

In addition, the servomotor control device 1B of the present embodiment may store rigidity data in a storage unit of an external server device connected via a network, for example.

(Servomotor Control Device according to Third Embodiment)

The first embodiment exemplifies semi-closed feedback control based on the deviation between the position FB1 value from the encoder 40 of the servomotor 50 and the position command value, or full-closed feedback control based on the deviation between the position FB2 value from the scale 80 of the table 70 and the position command value. The third embodiment exemplifies dual-position feedback control which performs semi-closed feedback control based on a first deviation between the position FB1 value and position command value, and full-closed feedback control based on a second deviation between the position FB2 value and position command value.

In FIG. 1, the servomotor control device 1C according to the third embodiment includes the motor control unit 10C as the aforementioned motor control unit 10.

Figure 7:
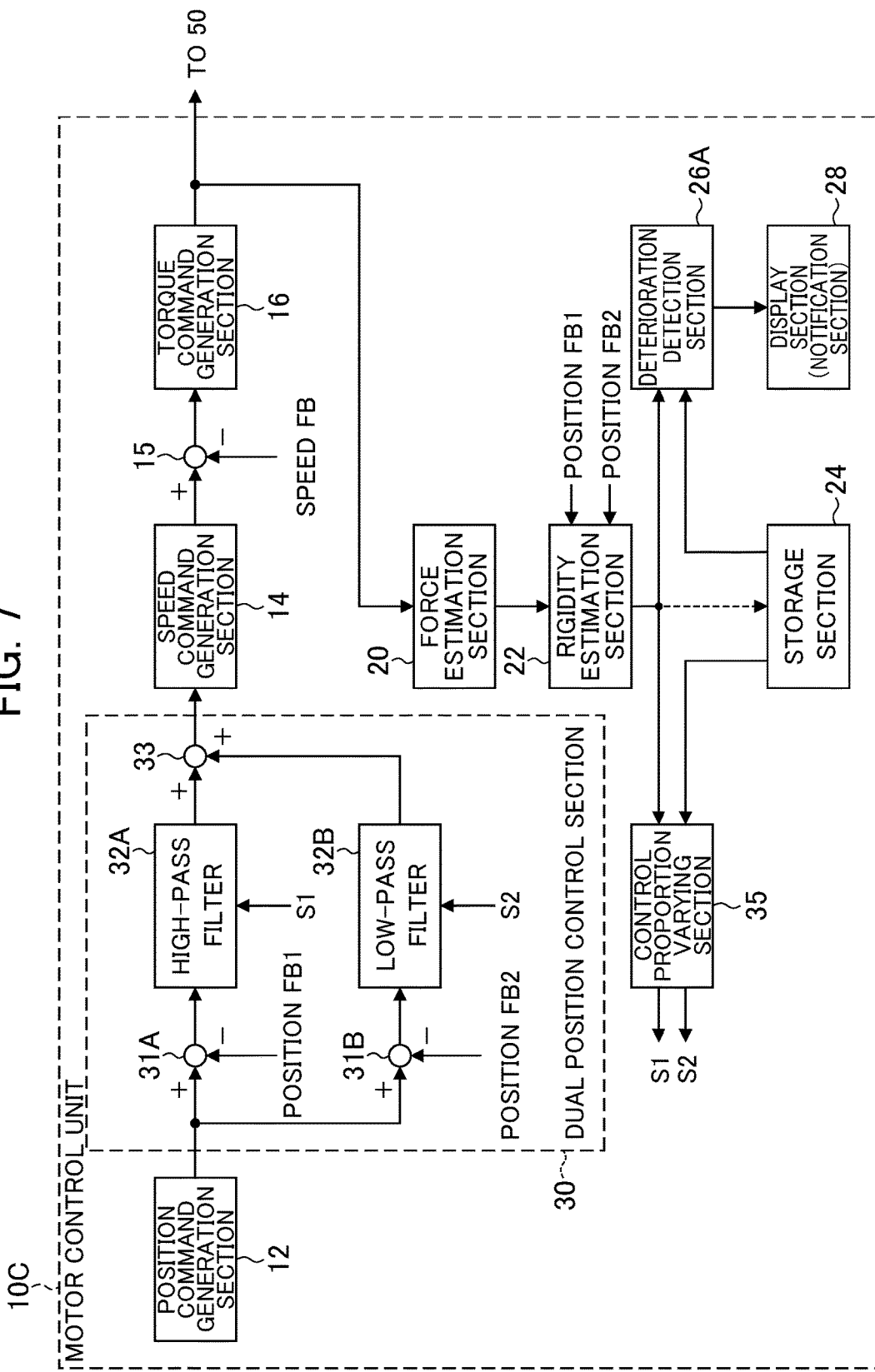
FIG. 7 is a view showing the configuration of a motor control unit in a servomotor control device according to a third embodiment.

FIG. 7 is a view showing the configuration of the motor control unit 10C of the servomotor control device 1C according to the third embodiment. The motor control unit 10C of the third embodiment shown in FIG. 7 differs from the first embodiment in the point of further including a dual position control section 30 and control proportion varying section 35 in place of the subtracter 13 of the motor control unit 10A shown in FIG. 2.

The dual position control section 30 performs semi-closed feedback control based on the high frequency component of first deviation between the position command value created by the position command generation section 12 and the position FB1 value from the encoder 40, and full-closed feedback control based on the low frequency component of the second deviation between the position command value and the position FB2 value from the scale 80. The dual position control section 30 includes subtracters 31A, 31B, a high-pass filter 32A, a low-pass filter 32B, and an adder 33.

The subtracter (first subtraction part) 31A obtains the first deviation between the position command value created by the position command generation section 12 and the position FB1 value from the encoder 40. The high-pass filter 32A allows a high frequency component of the first deviation obtained by the subtracter 31A to pass, and cuts the low frequency component. The cut-off frequency of the high-pass filter 32A is changed according to a control signal S1 from the control proportion varying section 35.

The subtracter (second subtraction part) 31B obtains the second deviation between the position command value created by the position command generation section 12 and the position FB2 value from the scale 80. The low-pass filter 32B allows the low frequency component of the second deviation obtained by the subtracter 31B to pass, and cuts the high frequency component. The cut-off frequency of the low-pass filter 32B is changed according to a control signal S2 from the control proportion varying section 35.

The adder 33 adds the high frequency component of the first deviation having passed through the high-pass filter 32A and the low frequency component of the second deviation having passed through the low-pass filter 32B, and sends to the speed command generation section 14.

Herein, the following relationship holds true between the cut-off frequencies f[Hz] of the high-pass filter 32A and low-pass filter 32B and the time constant τ[s].

$$f=1/(2\pi \times \tau)$$

Adjusting the cut-off frequency is thereby synonymous with adjusting the time constant.

When defining the first deviation as E1, and the second deviation as E2, the output EH of the high-pass filter 32A and the output EL of the low-pass filter 32B are represented as in the next formulas.

$$EH=\tau s/(1+\tau s) \times E1$$

$$EL=1/(1+\tau s) \times E2$$

s: angular frequency

The deviation added by the adder 33 is thereby expressed as in the next formula.

$$\text{Deviation}=\tau s/(1+\tau s) \times E1 + 1/(1+\tau s) \times E2 \quad (3)$$

At time constant τ=∞, i.e. cut-off frequency f-0, according to Formula (3) above, the deviation becomes E1, and the semi-closed feedback control becomes dominant. On the other hand, at time constant τ=0, i.e. cut-off frequency f=∞, the deviation becomes E2, and the full-closed feedback control becomes dominant. In addition, by controlling the magnitude of the time constant τ, i.e. magnitude of the cut-off frequency f, it is possible to vary the ratio of semi-closed feedback control to full-closed feedback control.

The storage section 24 stores a function that defines as input the magnitude of rigidity of the connection mechanism 60, and defines as output the control signals S1, S2 according to the inputted magnitude of rigidity, which change the cut-off frequency of the high-pass filter 32A and the cut-off frequency of the low-pass filter 32B. For example, the storage section 24 stores, as the function, a table in which the magnitude of rigidity and the control signals S1, S2 are associated. For example, in the table, control signals S1, S2 are set such that lower the cut-off frequency as the rigidity declines.

The control proportion varying section 35 varies the proportion of semi-closed feedback control to full-closed feedback control of the dual position control section 30, according to the magnitude of rigidity of the connection mechanism 60 estimated by the rigidity estimation section 22. More specifically, the control proportion varying section 35 causes the proportion of semi-closed feedback control to increase, and the proportion of full-closed feedback control to decrease, in response to a decline in the rigidity of the connection mechanism 60 thus estimated.

More specifically, the control proportion varying section 35 generates the control signals S1, S2 corresponding to the magnitude of rigidity of the connection mechanism 60 estimated by the rigidity estimation section 22, based on the function stored in the storage section 24 (for example, the table), and sends to the high-pass filter 32A and low-pass filter 32B, respectively. The control proportion varying section 35 thereby causes the cut-off frequencies of the high-pass filter 32A and low-pass filter 32B to vary. More specifically, the control proportion varying section 35 causes the cut-off frequencies of the high-pass filter 32A and low-pass filter 32B to decline in response to a decline in the estimated rigidity of the connection mechanism 60.

The control signals S1, S2 may be the same or may differ. In other words, the cut-off frequency of the high-pass filter 32A and the cut-off frequency of the low-pass filter 32B may be the same or may differ. In the case of the cut-off frequencies of these filters being the same, it is possible to make the frequency characteristic of deviation added by the adder 33 to be a characteristic closer to flat over the entire region, when the values of E1 and E2 are close values. It should be noted that, in the case of the cut-off frequencies of these filters not being the same, since the frequency components between cut-off frequencies of these filters are attenuated or amplified, a certain specific frequency component of these may be amplified or attenuated.

Next, proportion varying operation of the dual position feedback control by the servomotor control device 1C of the third embodiment will be explained by referencing FIG. 8. FIG. 8 is a flowchart showing the proportion varying operation of the dual position feedback control by the servomotor control device 1C of the third embodiment.

First, in Steps S11 and S12 of FIG. 8, i.e. by way of the aforementioned operations of Steps S11 and S12 in FIG. 3, the magnitude of rigidity of the connection mechanism 60 is estimated by the rigidity estimation section 22.

Herein, when the rigidity of the connection mechanism 60 declines, the resonance frequency of the servomotor control device (i.e. machine tool) declines, and the possibility of low-frequency vibrations being produced in the machine tool rises. If low-frequency vibrations occur in the machine tool, the machining precision of the machine tool will decline.

Therefore, in Step S41, the control proportion varying section 35 generates the control signals S1, S2 corresponding to the magnitude of rigidity of the connection mechanism 60 estimated by the rigidity estimation section 22, based on the function (e.g., table) stored in the storage section 24, and sends to the high-pass filter 32A and low-pass filter 32B of the dual position control section 30, respectively. The control proportion varying section 35 thereby causes the cut-off frequencies of the high-pass filter 32A and low-pass filter 32B to vary. More specifically, the control proportion varying section 35 causes the cut-off frequencies of the high-pass filter 32A and low-pass filter 32B to decline in response to a decline in the estimated rigidity of the connection mechanism 60.

The proportion of the low-frequency component of the second deviation between the position command value and position FB2 value passing through the low-pass filter 32B thereby decreases, and the proportion of the high frequency component of the first deviation between the position command value and position FB1 value passing through the high-pass filter 32A increases. For this reason, the proportion of full-closed feedback control based on the low frequency component of the second deviation decreases, and the proportion of semi-closed feedback control based on the high frequency component of the first deviation increases.

Herein, with the dual position control section 30, semi-closed feedback control including the high-pass filter 32A becomes dominant during transient operation in which high-frequency deviation is generated. On the other hand, during positioning in which low-frequency deviation is generated, full-closed feedback control including the low-pass filter 32B becomes dominant.

The semi-closed feedback control based on the first deviation between the position command value and position FB1 value has a characteristic of control being stable, due to using the position FB1 from the encoder 40 of the servomotor 50, i.e. due to the connection mechanism 60 not being included in the feedback loop. On the other hand, the full-closed feedback control based on the second deviation between the position command. value and the position FB2 value has a characteristic of high positioning precision, due to using the position FB2 value from the scale 80 provided close to the table (driven body) 70.

According to the dual position control section 30, it is thereby possible to obtain stable operation during transient operation, and possible to suppress vibration of the machine tool. On the other hand, it is possible to obtain high positioning precision during positioning.

Furthermore, since the cut-off frequency of the high-pass filter 32A and the cut-off frequency of the low-pass filter 32B are made to decline in response to a decline in rigidity of the connection mechanism 60 by the control proportion varying section 35, the proportion of full-closed feedback control including the connection mechanism 60 decreases, and the proportion of semi-closed feedback control capable of stable operation without including the connection mechanism 60 increases. It is thereby possible to suppress the occurrence of vibration in the machine tool caused by a decline in rigidity of the connection mechanism 60, without harming the high positioning precision during positioning. For this reason, it is possible to suppress a decline in the machining precision of the machine tool caused by the occurrence of vibration in the machine tool.

It should be noted that switching from semi-closed feedback control during transient operation to full-closed feedback control during positioning becomes gentle (becomes slower) with lower cut-off frequencies of the high-pass filter 32A and low-pass filter 32B.

Subsequently, in Steps S13 and S14, i.e. according to the operations of aforementioned Steps S13 and S14 in FIG. 3, detection of deterioration of the connection mechanism 60 is performed by the deterioration detection section 26A, and information indicating the deterioration of the connection mechanism 60 is displayed by the display section 28 in the case of deterioration being detected.

It is possible to obtain similar advantages to the servomotor control device 1A of the first embodiment, also with the servomotor control device 1C of the present embodiment.

Furthermore, according to the servomotor control device 1C of the present embodiment, the control proportion varying section 35 causes the cut-off frequency of the high-pass filter 32A and the cut-off frequency of the low-pass filter 32B of the dual position control section 30, in response to a decline in the rigidity of the connection mechanism 60 estimated by the rigidity estimation section 22. The proportion of the full-closed feedback control based on the low-frequency component of the second deviation between the position command value and the position FB2 value thereby decreases, and the proportion of the semi-closed feedback control based on the high-frequency component of the first deviation between the position command value and the position FB1 value increases. In other words, the proportion of the full-closed feedback control including the connection mechanism 60 decreases, and the proportion of the semi-closed feedback control capable of stable operation without including the connection mechanism 60 increases. It is thereby possible to suppress the occurrence of vibration of the machine tool caused by the decline in rigidity of the connection mechanism 60, without harming the high positioning precision during positioning. For this reason, it is possible to suppress the decline in the machining precision of the machine tool caused by the occurrence of vibration of the machine tool.

Although embodiments of the present invention have been explained above, the present invention is not to be limited to the aforementioned embodiments. In addition, the effects described in the present embodiment are merely exemplifying the most preferred effects produced from the present invention, and the effects according to the present invention are not limited to those described in the present embodiment.

For example, the aforementioned embodiments may be modified as appropriate, and may be realized by being combined. For example, the first embodiment and second embodiment may be combined so that, in the case of the current magnitude of rigidity being larger than the threshold, the change in rigidity and variation are detected and displayed, and in the case of the current magnitude of rigidity having declined to no more than the threshold, the deterioration in rigidity is detected and displayed.

In addition, in the aforementioned embodiments, a display section is exemplified as an example of a notification section; however, the notification section is not limited thereto. For example, the notification section may be a light emitting part such as one or a plurality of LEDs. In the case of being one LED, different information may be notified by way of illuminating, flashing, and the like. In addition, in the case of being a plurality of LEDs, different information may be notified by way of the number illuminated of the same color, or different colors. In addition, for example, the notification section may be a sound generating unit such as for a buzzer sound or voice.

In addition, in the aforementioned first and second embodiments, a form performing position control based on a position command is exemplified as the servomotor control device; however, the features of the present invention are also applicable to forms that perform speed control based on a speed command.

EXPLANATION OF REFERENCE NUMERALS 1, 1A, 1B, 1C servomotor control device
10, 10A, 10B, 10C motor control unit
12 position command generation section
13, 15 subtracter
14 speed command generation section
16 torque command generation section
20 force estimation section
22 rigidity estimation section
24 storage section
26A deterioration detection section (rigidity variation detection section)
26B rigidity variation detection section
28 display section (notification section)
30 dual position control section
31A subtracter (first subtraction part)
31B subtracter (second subtraction part)
32A high-pass filter
32B low-pass filter
33 adder (addition part)
35 control proportional varying section
40 encoder (first position detection section)

50 servomotor
60 connection mechanism
61 coupling
62 ball screw
63 nut
70 table (driven body)
80 scale (second position detection section)

What is claimed is:

1. A servomotor control device comprising:
a servomotor;
a driven body that is driven by way of the servomotor;
a connection mechanism. that connects the servomotor and the driven body to transmit power of the servomotor to the driven body;
a first position detection section that detects a position of the servomotor;
a second position detection section that detects a position of the driven body; and
a motor control unit that controls the servomotor,
wherein the motor control unit includes:
a force estimation section that estimates a drive force acting on the driven body at a connection part between the connection mechanism and the driven body;
a rigidity estimation section. that estimates a magnitude of rigidity of the connection mechanism based on a position of the servomotor detected. by the first position detection section, a position of the driven body detected. by the second position detection section, and a drive force estimated by the drive force estimation. section; and
a rigidity variation detection section that detects a change in rigidity of the connection mechanism, based on the magnitude of rigidity estimated by the rigidity estimation section.

2. The servomotor control device according to claim 1, wherein the rigidity estimation section estimates a magnitude of rigidity (R) of the connection mechanism according to Formula (1), based on a difference (δ) between a position of the servomotor detected by the first position detection section and a position of the driven body detected by the second position detection section, and a drive force (T) estimated by the force estimation section:

Magnitude of rigidity (R)=drive force (T)/difference (δ) between position of servomotor and position of driven body   (1).

3. The servomotor control device according to claim 1, wherein the rigidity variation detection section detects deterioration of the connection mechanism as a change in rigidity of the connection mechanism, when the magnitude of rigidity estimated by the rigidity estimation section declines to no more than a predetermined threshold.

4. The servomotor control device according to claim 3, wherein the motor control unit further includes a notification section that notifies information indicating deterioration detected by the rigidity variation detection section, or information indicating the magnitude of rigidity detected by the rigidity estimation section.

5. The servomotor control device according to claim 4, wherein the notification section is a display device which displays information.

6. The servomotor control device according to claim 1, wherein the motor control unit further includes a storage section that stores, as rigidity data, a plurality of magnitudes of rigidity estimated by the rigidity estimation section at every predetermined time interval or indefinite time interval, and
wherein the rigidity variation detection section detects a change and variation in rigidity of the connection mechanism based on the rigidity data stored in the storage section.

7. The servomotor control device according to claim 6, wherein the motor control unit further includes a notification section that notifies information indicating at least one of the change and a variation in rigidity detected by the rigidity variation detection section, or information indicating the magnitude of rigidity detected by the rigidity estimation section.

8. The servomotor control device according to claim 1, wherein the motor control unit further includes:
a dual position control section that performs semi-closed feedback control based on a high-frequency component of a first deviation between a position command value for drive control of the servomotor and the position of the servomotor detected by the first position detection section, and full-closed feedback control based on a low-frequency component of a second deviation between the position command value and the position of the driven body detected by the second position detection section; and
a control proportion varying section that causes a proportion of the semi-closed feedback control to increase, and a proportion of the full-closed feedback control to decrease in the dual position control section, in response to a decline in the rigidity of the connection mechanism estimated by the rigidity estimation section.

9. The servomotor control device according to claim 8, wherein the dual position control section further includes:
a first subtraction part that obtains a first deviation between the position command value and the position of the servomotor detected by the first position detection section;
a second subtraction part that obtains a second. deviation between the position command value and the position of the driven body detected by the second position detection section;
a high-pass filter that inputs the first deviation from the first subtraction part;
a low-pass filter that inputs the second deviation from the second subtraction part; and
an addition part that adds a high-frequency component of the first deviation outputted from the high-pass filter and a low-pass component of the second deviation outputted from the low-pass filter, and
wherein the control proportion varying section causes a cut-off frequency of the high-pass filter and a cut-off frequency of the low-pass filter to decline in response to a decline in the rigidity of the connection mechanism.

10. The servomotor control device according to claim 9, wherein the control proportion varying section sets the cut-off frequency of the high-pass filter and the cut-off frequency of the low-pass filter to be the same.

* * * * *